(12) United States Patent
Nisar et al.

(10) Patent No.: US 9,673,850 B2
(45) Date of Patent: Jun. 6, 2017

(54) RADIO COMMUNICATION DEVICES AND METHODS FOR CONTROLLING A RADIO COMMUNICATION DEVICE

(71) Applicant: Intel IP Corporation, Santa Clara, CA (US)

(72) Inventors: M Danish Nisar, Munich (DE); Rajarajan Balraj, Nuremberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/801,872

(22) Filed: Jul. 17, 2015

(65) Prior Publication Data
US 2016/0049970 A1 Feb. 18, 2016

(30) Foreign Application Priority Data
Aug. 18, 2014 (DE) .......................... 10 2014 111 735

(51) Int. Cl.
*H04B 17/345* (2015.01)
*H04B 1/10* (2006.01)
(Continued)

(52) U.S. Cl.
CPC ......... *H04B 1/1027* (2013.01); *H04B 17/345* (2015.01); *H04B 17/3912* (2015.01);
(Continued)

(58) Field of Classification Search
CPC .............. H04L 25/03; H04L 25/03891; H04L 25/03949; H04L 27/01; H04L 1/20;
(Continued)

(56) References Cited

U.S. PATENT DOCUMENTS 6,801,565 B1 * 10/2004 Bottomley ............. H04B 1/712
375/148
7,050,514 B2 * 5/2006 Rainbolt ............. H04B 17/345
375/262
(Continued)

FOREIGN PATENT DOCUMENTS

GB 2510583 A 8/2014
WO 2009058151 A1 5/2009

OTHER PUBLICATIONS

Office action received for German Patent Application No. 102014111735.2, dated Jul. 17, 2015, 7 pages of office action and 4 pages of English translation.
(Continued)

*Primary Examiner* — Emmanual Bayard
(74) *Attorney, Agent, or Firm* — Viering, Jentschura & Partner mbB

(57) ABSTRACT

A radio communication device is described comprising: a receiver configured to receive radio signals on a radio channel; a noise level determination circuit configured to determine a noise level of the radio signals; an interference determination circuit configured to determine interference information indicating an amount of interference of the radio signals with other signals; an equalizer configured to determine a softbit based on the radio signals and based on the noise level; and a scaling circuit configured to scale based on the determined interference information at least one of the noise level or the softbit.

24 Claims, 6 Drawing Sheets

(51) Int. Cl.
*H04L 27/01* (2006.01)
*H04L 25/02* (2006.01)
*H04L 25/06* (2006.01)
*H04B 17/391* (2015.01)
*H04L 5/00* (2006.01)
*H04J 11/00* (2006.01)
*H04L 27/26* (2006.01)

(52) U.S. Cl.
CPC ...... *H04L 25/0204* (2013.01); *H04L 25/0228* (2013.01); *H04L 25/067* (2013.01); *H04L 27/01* (2013.01); *H04J 11/005* (2013.01); *H04L 5/005* (2013.01); *H04L 5/0007* (2013.01); *H04L 5/0051* (2013.01); *H04L 27/2647* (2013.01)

(58) Field of Classification Search
CPC ... H04L 25/024; H04L 25/067; H04B 1/7107; H04B 1/7103; H04B 17/336; H04B 17/345
USPC .................................................. 375/229–234
See application file for complete search history.

(56) References Cited

U.S. PATENT DOCUMENTS

| | | | | | |
|---|---|---|---|---|---|
| 7,065,166 | B2* | 6/2006 | Singh | ................ | H04B 1/7097 375/346 |
| 7,103,316 | B1* | 9/2006 | Hall | ................ | H04B 17/318 455/226.2 |
| 7,307,975 | B2* | 12/2007 | Tyra | ................ | H04B 1/70755 370/335 |
| 7,555,067 | B2* | 6/2009 | Jeong | ................ | H04B 1/707 375/340 |
| 7,567,635 | B2* | 7/2009 | Scheim | ................ | H04L 1/0045 375/341 |
| 7,668,226 | B2* | 2/2010 | Cairns | ................ | H04B 1/712 375/136 |
| 7,680,203 | B2* | 3/2010 | Kuroda | ................ | H04L 25/0202 375/267 |
| 7,684,503 | B2* | 3/2010 | Hayashi | ................ | H04L 1/20 375/260 |
| 7,724,816 | B2* | 5/2010 | Chen | ................ | H04B 1/1027 375/229 |
| 7,813,457 | B2* | 10/2010 | Krupka | ................ | H04W 16/00 375/148 |
| 7,852,915 | B2* | 12/2010 | Chen | ................ | H04L 25/03038 375/233 |
| 7,860,194 | B2* | 12/2010 | Kim | ................ | H04L 1/0052 375/262 |
| 8,126,072 | B2* | 2/2012 | Namgoong | ................ | H04B 1/1027 375/260 |
| 8,130,849 | B2* | 3/2012 | Lincoln | ................ | H04L 1/20 327/100 |
| 8,284,874 | B2* | 10/2012 | Valadon | ................ | H04L 1/1845 375/341 |
| 8,379,778 | B2* | 2/2013 | Yan | ................ | H04L 25/03006 375/130 |
| 8,462,893 | B2* | 6/2013 | Weitkemper | ................ | H04L 1/0055 375/340 |
| 8,731,038 | B2* | 5/2014 | Pean | ................ | H04L 1/0001 370/210 |
| 8,761,317 | B2* | 6/2014 | Jonsson | ................ | H03M 13/6337 327/551 |
| 8,867,445 | B2* | 10/2014 | Åhlander | ................ | 370/328 |
| 8,982,866 | B1* | 3/2015 | Katzir | ................ | H04B 1/7097 370/342 |
| 2007/0110006 | A1* | 5/2007 | DiFazio | ................ | H04B 1/7093 370/337 |
| 2008/0069270 | A1* | 3/2008 | Tyra | ................ | H04B 1/70755 375/317 |
| 2008/0194221 | A1* | 8/2008 | Uramoto | ................ | H04B 1/123 455/226.1 |
| 2009/0041165 | A1* | 2/2009 | Higashinaka | ................ | H04B 1/71057 375/341 |
| 2014/0321296 | A1* | 10/2014 | Balraj | ................ | H04L 5/0032 370/252 |
| 2015/0003260 | A1* | 1/2015 | Balraj | ................ | H04B 17/26 370/252 |
| 2015/0295670 | A1* | 10/2015 | Seyama | ................ | H04J 11/005 370/329 |
| 2015/0295737 | A1* | 10/2015 | Kim | ................ | H04L 25/03318 375/267 |
| 2015/0318883 | A1* | 11/2015 | McCloud | ................ | H04B 1/1027 375/148 |

OTHER PUBLICATIONS

Office action received for Taiwanese Patent Application No. 104122560, dated May 26, 2016, 4 pages of office action and 6 pages of English translation.

Taiwanese Office Action based on Application No. 104122560(6 Pages and 4 pages of English translation) dated Dec. 22, 2016 (Reference Purpose Only).

* cited by examiner

RADIO COMMUNICATION DEVICES AND METHODS FOR CONTROLLING A RADIO COMMUNICATION DEVICE

CROSS-REFERENCE TO RELATED APPLICATION

This application claims priority to German Patent Application Serial No. 10 2014 111 735.2, which was filed Aug. 18, 2014, and is incorporated herein by reference in its entirety.

TECHNICAL FIELD

The present disclosure generally relates to radio communication devices and methods for controlling a radio communication device.

BACKGROUND

In a typical cell-edge scenario, for example when a mobile radio communication device is in communication with a first base station, but already can receive signals from a second base station, the mobile radio communication device may encounter strong inter-cell interference owing to the frequency reuse factor. Thus, it may be desired to reduce the inter-cell interference.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

Figure 1:
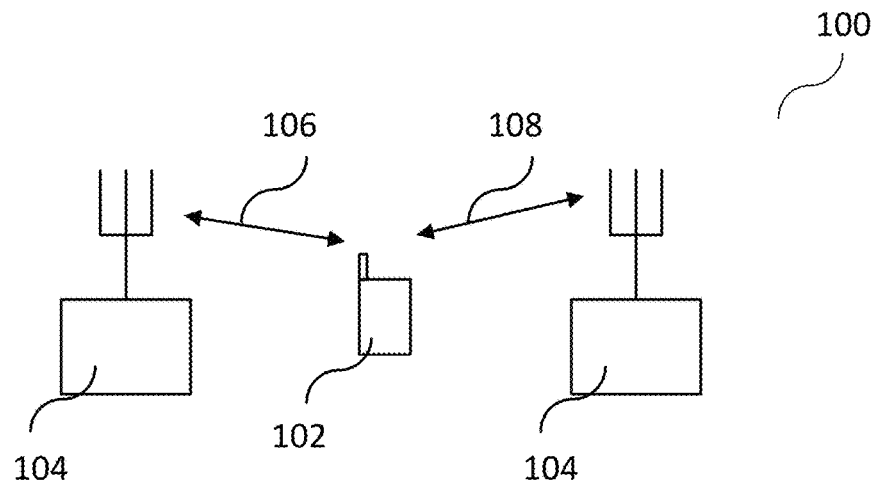
FIG. 1 shows a mobile radio communication system.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a mobile radio communication system 100. A mobile radio communication device 102 may receive a signal from a first base station 104, for example wirelessly like indicated by arrow 108. The mobile radio communication device 102 may further receive a signal from a second base station 106, for example wirelessly like indicated by arrow 110.

In a typical cell-edge scenario, for example when the mobile radio communication device 102 is in communication with the first base station 104, but already can receive signals from the second base station 106, the mobile radio communication device may encounter strong inter-cell interference owing to the frequency reuse factor (for example the frequency reuse factor of one employed in LTE (Long Term Evolution; which is a 3GPP (3rd Generation Partnership Project) standard)).

Regardless of whether the interfering cell is in ABS (Almost Blank Sub-frame) or non-ABS mode, cell specific reference signals (CRS) may be always transmitted, and as such may interfere with the serving cell PDCCH (Physical Downlink Control Channel)/PCFICH (Physical Control Format Indicator Channel)/PHICH (Physical Hybrid-ARQ Indicator Channel) transmissions. However, because the CRS is transmitted at certain periodic shifts of resource elements (REs), and not all REs, the encountered interference level may be inherently different at different possible CRS shifts. It may be distinguished between the ABS and non-ABS cases, because in ABS sub-frames, all inter-cell interference except for the CRS interference may vanish. Even in this scenario, the shift-dependent scaling scheme according to various embodiments may be useful, because of the fluctuating interference levels across shift locations.

Approaches for interference mitigation for control channels in LTE include:

CRS interference cancellation (CRS-IC) that attempts to reconstruct the CRS interference and then subtracts it from the received signal; and Spatial (and spatio-temporal) interference suppression (schemes) that involves whitening of interference along spatial (and temporal) dimension by employing the appropriate (spatial or spatio-temporal) covariance matrix. For example, these schemes may be schemes where the spatial or spatio-temporal correlation of interference (unlike the white noise) is exploited to gain in terms of the signal to noise ratio. They may be a form of interference mitigation approaches, and may be employed in communication receivers expected to operate in interference scenarios.

Various aspects of this disclosure may be applied on top of these schemes and may bring an additional performance gain in control channel reception. For example, while the interference suppression techniques attempt to suppress the interference along spatial or temporal direction, the scheme according to various aspects of this disclosure may exploit the fact that interference level is dependent on shifts along the frequency direction.

In the following, use cases of the scheme according to various aspects of this disclosure, which further highlight this complementary nature of the scheme according to various aspects of this disclosure, will be described:

Multiple interferer scenarios: The CRS-IC approach may desire channel estimation of the interferer and therefore may be reliably achieved or applied only for a single interferer or at most two interferers. The approach according to various aspects of this disclosure may then be used in combination with CRS-IC for the most dominant interferer followed by PDCCH scaling (like will be described in more detail below) to handle the second and third most dominant interferers.

Asynchronous interferer scenarios: In practice, interfering cells may not be synchronized with the serving cell, leading to problems in CRS-IC approach for interference mitigation.

Mismatched parameters in scenario detection (e.g. wrong assumption on antenna ports, MBSFN (Multicast-Broadcast Single-Frequency Network) sub-frame configuration, Bandwidth etc.) when CRS-IC performance is severely impaired.

Residual CRS interference after CRS-IC (e.g. owing to channel estimation errors, time offsets).

The scheme according to various aspects of this disclosure may be applied in non-ABS scenarios, where CRS-IC has been performed, and as such PDCCH REs on which CRS-IC is performed may be more reliable as compared to other REs.

The scheme according to various aspects of this disclosure may extract the information on the distinctive variation of the interference level at various shift locations in the control region, and may then exploit this information to pursue a reliability scaling on the PDCCH symbols/soft-bits coming from different shift locations and different OFDM symbols.

Figure 2:
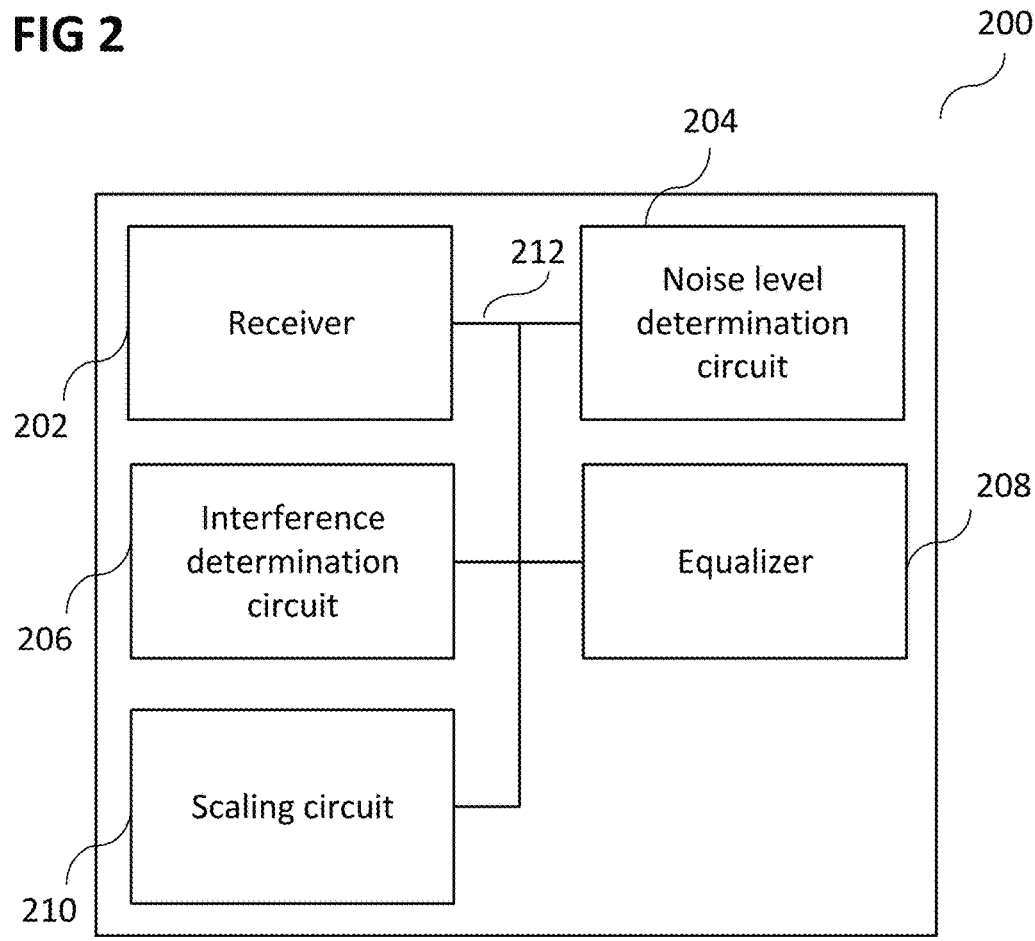
FIG. 2 shows a radio communication device with a receiver, a noise level determination circuit, an interference determination circuit, an equalizer, and a scaling circuit.

FIG. 2 shows a radio communication device 200. The radio communication device 200 may include a receiver 202 configured to receive a radio signal on a radio channel. The radio communication device 200 may further include a noise level determination circuit 204 configured to determine a noise level of the radio signal. The radio communication device 200 may further include an interference determination circuit 206 configured to determine interference information indicating an amount of interference of the radio signal with another signal. The radio communication device 200 may further include an equalizer 208 configured to determine a softbit based on the radio signal and the determined noise level. The radio communication device 200 may further include a scaling circuit 210 configured to scale based on the determined interference information at least one of the noise level and/or the softbit. The softbit may indicate a probability of a bit represented by the radio signals to have a pre-determined value. The receiver 202, the noise level determination circuit 204, the interference determination circuit 206, the equalizer 208, and the scaling circuit 210 may be coupled with each other, for example via a connection 212, for example an optical connection or an electrical connection, such as for example a cable or a computer bus or via any other suitable electrical or electromagnetic connection to exchange signals.

In other words, in a radio communication device, either an input (for example the noise level) and/or an output (for example a softbit) of an equalizer may be scaled based on a determined interference.

For example, the softbit may be a real number (or a representation of a real number in a data processing device). For example, the softbit may have a value between −1 and 1. A softbit with a positive value may represent a pre-determined value (in other words: bit value) of 1 with a probability (or certainty or confidence), which may be determined based on the value of the softbit. A softbit with a negative value may represent a pre-determined value (in other words: bit value) of 0 with a probability (or certainty or confidence), which may be determined based on the value of the softbit. A value of −1 may mean that the softbit represents the pre-determined value of 0 (in other words: a bit having a value of 0). A value of 1 may mean that the softbit represents the pre-determined value of 1 (in other words: a bit having a value of 1). A softbit which has a value close to −1 may mean that the value of the bit is likely to be 0. A softbit which has a value close to 1 may mean that the value of the bit is likely to be 1. A softbit which has a value close to 0 may mean that no information is available as to whether the value of the bit is 0 or 1. As such, downscaling (in other words): multiplying by a number between 0 and 1, or dividing by a number greater than 1) of a softbit may represent reducing the probability (or certainty) that the softbit represents the pre-determined value (in other words: the bit value, for example 0 or 1).

The softbit may represent the log-likelihood ratio (LLR) of a bit being 1 or 0. It will be understood that the soft bit (or LLR) needs not to be in the range of [−1 to +1]. It can have for instance integer representations from [−32 to +32].

The noise level determination circuit 204 may be configured to determine the noise level of the radio signals based on pilot symbols.

Figure 3:
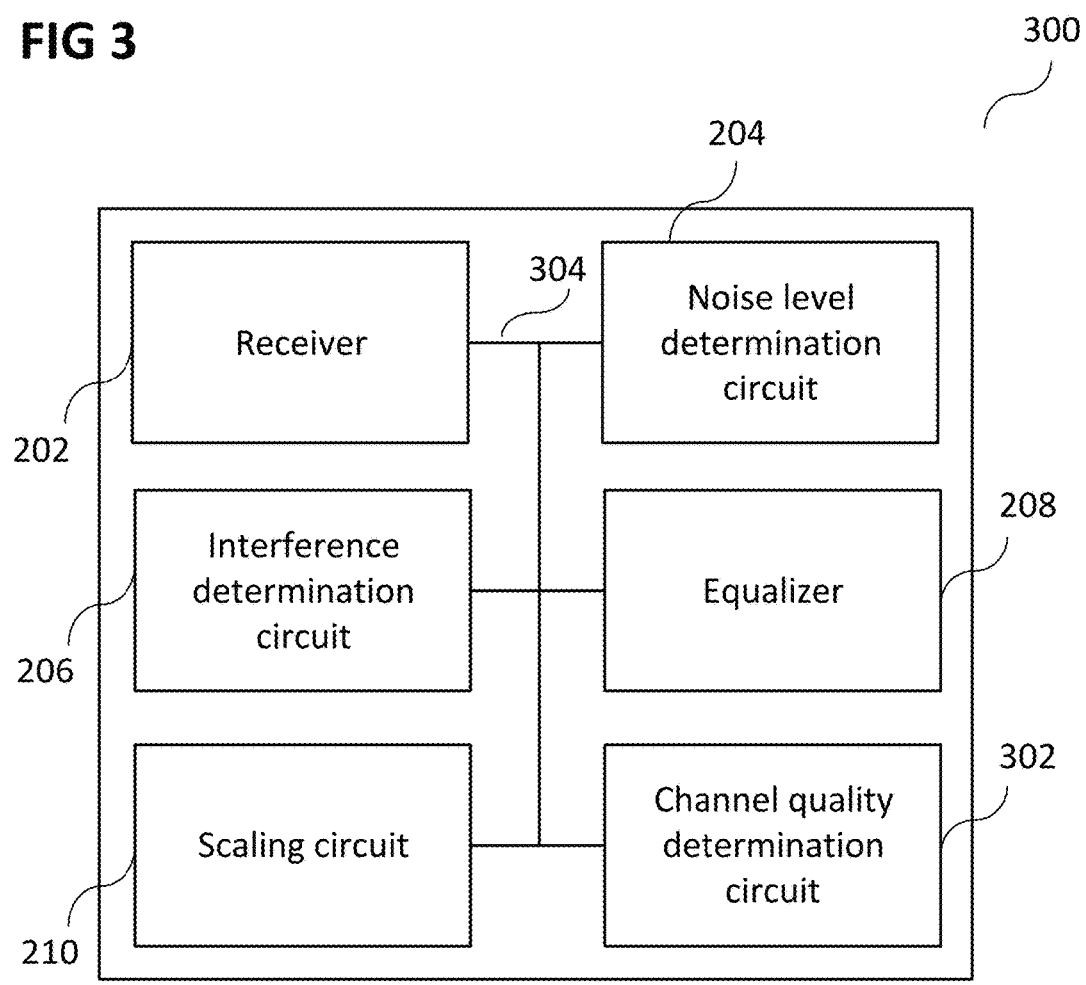
FIG. 3 shows a radio communication device with a receiver, a noise level determination circuit, an interference determination circuit, an equalizer, a scaling circuit, and a channel quality determination circuit.

FIG. 3 shows a radio communication device 300. The radio communication device 300 may, similar to the radio communication device 200 shown in FIG. 2, include a receiver 202 configured to receive a radio signal on a radio channel. The radio communication device 300 may, similar to the radio communication device 200 shown in FIG. 2, further include a noise level determination circuit 204 configured to determine a noise level of the radio signal. The radio communication device 300 may, similar to the radio communication device 200 shown in FIG. 2, further include an interference determination circuit 206 configured to determine interference information indicating an amount of interference of the radio signal with another signal. The radio communication device 300 may, similar to the radio communication device 200 shown in FIG. 2, further include an equalizer 208 configured to determine a softbit based on the radio signal and the determined noise level. The radio communication device 200 300 may, similar to the radio communication device 200 shown in FIG. 2, further include a scaling circuit 210 configured to scale based on the determined interference information at least one of the noise level and/or the softbit. The softbit may indicate a probability of a bit represented by the radio signals to have a pre-determined value. The radio communication device 200 may further include a channel quality determination circuit 302, like will be described in more detail below. The receiver 202, the noise level determination circuit 204, the interference determination circuit 206, the equalizer 208, the scaling circuit 210, and the channel quality determination circuit 302 may be coupled with each other, for example via a connection 304, for example an optical connection or an electrical connection, such as for example a cable or a computer bus or via any other suitable electrical or electromagnetic connection to exchange signals.

The channel quality determination circuit 302 may be configured to determine a quality of the radio channel. The equalizer 208 may be configured to determine the softbit further based on the determined quality of the radio channel.

The channel quality determination circuit 302 may be configured to determine the quality of the radio channel based on the determined quality of the radio channel.

The scaling circuit 210 may be configured to scale for different symbols in a resource element differently.

The interference determination circuit 206 may be configured to determine the interference information for a plurality of shift locations in an OFDM symbol.

The scaling circuit 210 may be configured to scale for different symbols in a resource element identically.

The scaling circuit 210 may be configured to upscale the noise level.

The scaling circuit 210 may be configured to downscale the softbit.

The scaling circuit 210 may be configured to determine a scaling factor and configured to scale based on the scaling factor.

The scaling circuit 210 may be configured to determine the scaling factor for a pre-determined shift in an OFDM symbol based on a square root of a quotient of a minimum inter-cell interference encountered at various shifts in the OFDM symbol and the inter-cell interference at the pre-determined shift in the OFDM symbol.

Figure 4:
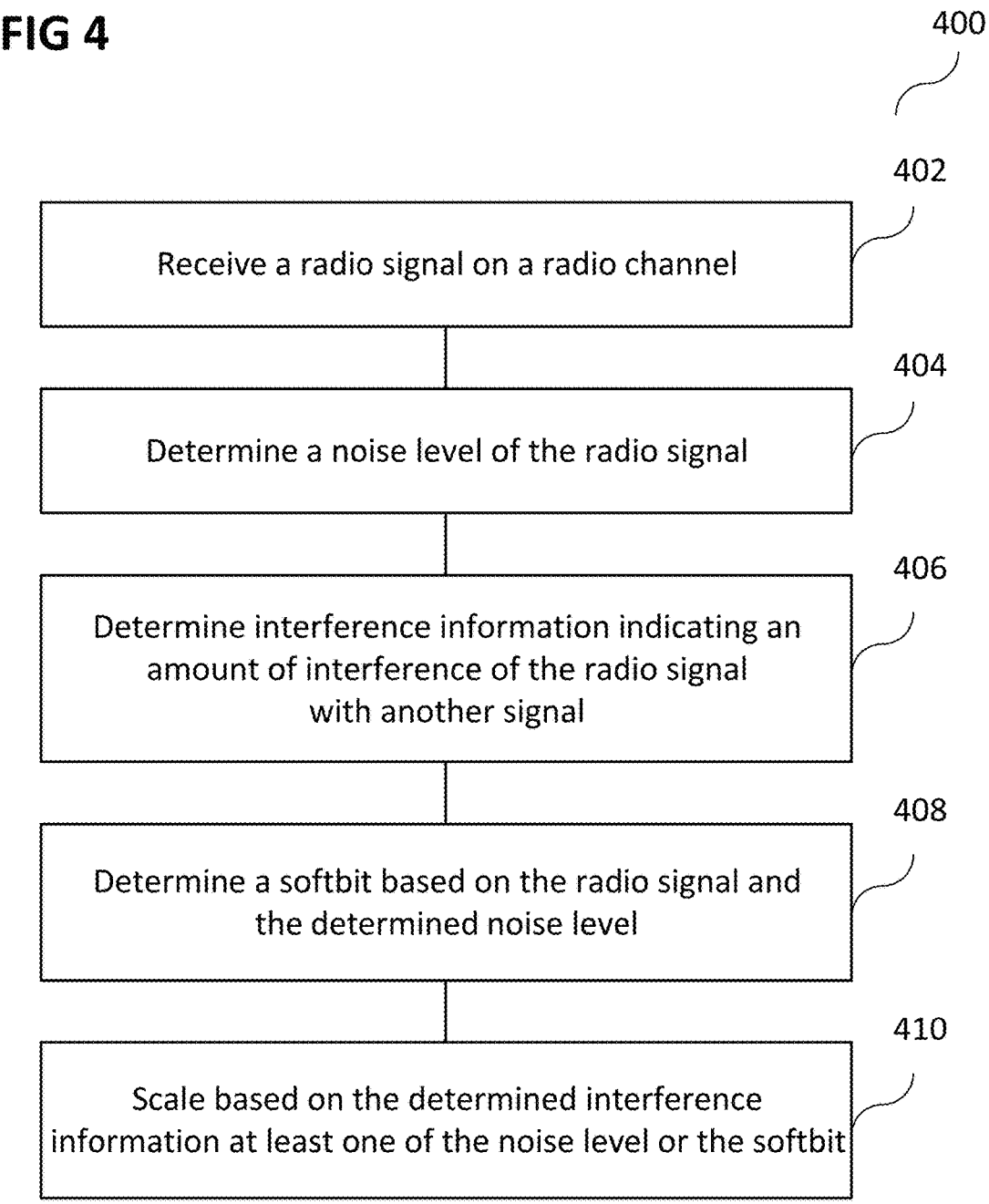
FIG. 4 shows a flow diagram illustrating a method for controlling a radio communication device.

FIG. 4 shows a flow diagram 400 illustrating a method for controlling a radio communication device. In 402, a receiver of the radio communication device may receive a radio signal on a radio channel. In 404, a noise level determination circuit of the radio communication device may determine a noise level of the radio signal. In 406, an interference determination circuit of the radio communication device may determine interference information indicating an amount of interference of the radio signal with another signal. In 408, an equalizer of the radio communication device may determine a softbit based on the radio signal and the determined noise level. In 410, a scaling circuit of the radio communication device may scale based on the determined interference information at least one of the noise level and/or the softbit. The softbit may indicate a probability of a bit represented by the radio signals to have a pre-determined value.

Figure 5:
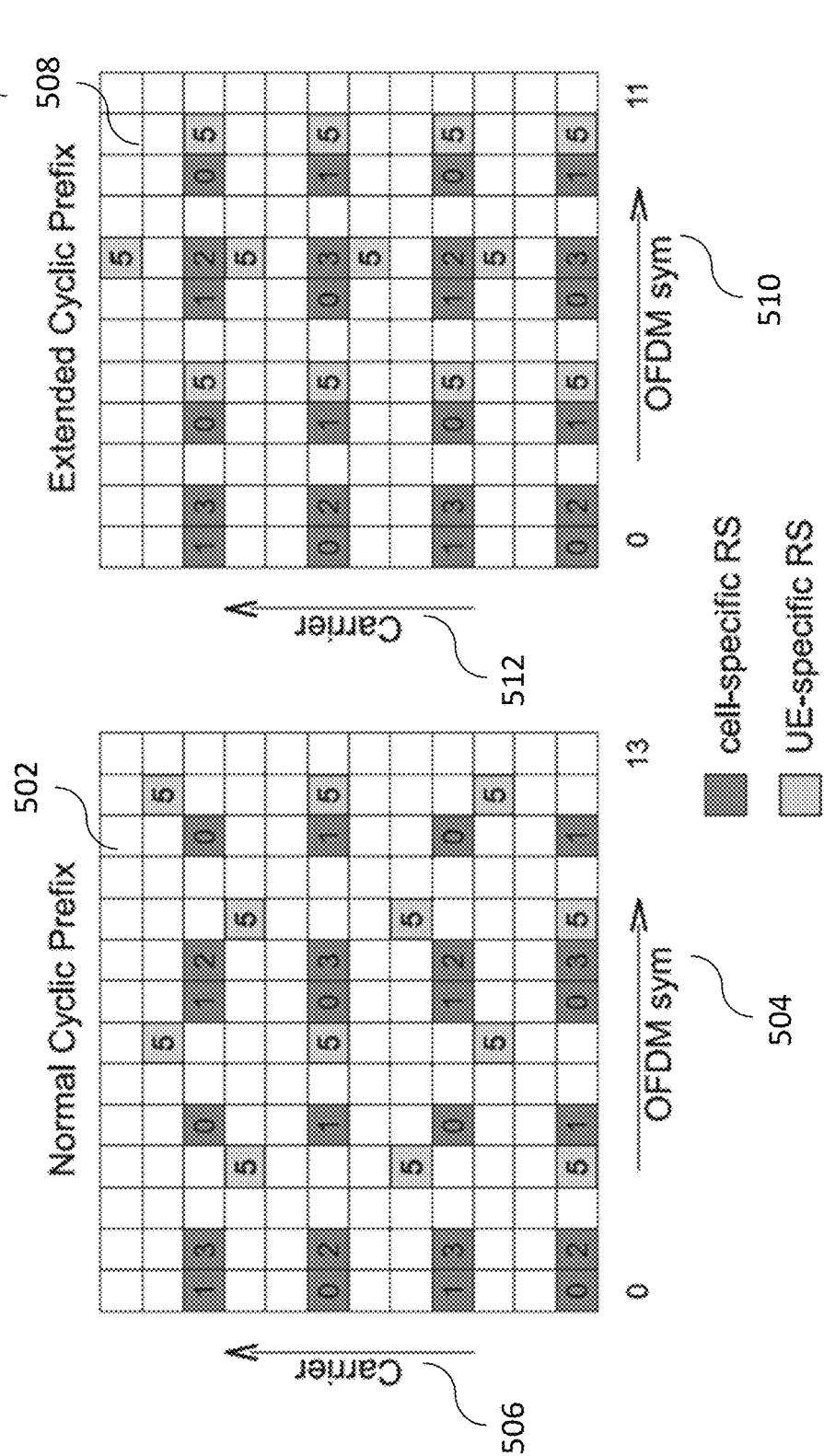
FIG. 5 shows illustrations of serving cell CRS patterns.

FIG. 5 shows an illustration 500 of a serving cell CRS pattern in a normal cyclic prefix case 502 and of a serving cell CRS pattern in an extended cyclic prefix case 508. For the normal cyclic prefix case, a grid of OFDM symbol on a horizontal axis 504 and carrier (or carrier frequency) on a vertical axis 506 are shown. Each block indicates a resource element (RE), and 12 RE may form one resource block (RB). For the extended cyclic prefix case, a grid of OFDM symbol on a horizontal axis 510 and carrier (or carrier frequency) on a vertical axis 512 are shown. Cell specific RS (CRS) are shown as gray blocks with numbers between 0 and 3, wherein the number in the block may indicate an index of an antenna port for transmission of the CRS. For example, a gray block with number 3 may represent the CRS location (or CRS symbol) which may be transmitted by the transmit antenna port with index 3. UE (user equipment) specific reference signals (RS) are indicated by gray blocks with number 5. It will be understood that the UE specific RS may not be present at all times. Furthermore, it will be understood that the location of the RS as shown in FIG. 5 is merely an example of possible locations for serving cell CRS, which may be used in the following for the ease of explanation. The PDCCH may occupy up to first 3 OFDM symbols.

The interfering cell CRS (not shown in the diagrams of FIG. 5) might be at some zero or non-zero shift (along frequency; in vertical direction in the diagrams shown in FIG. 5) of this serving cell pattern. This may lead to distinctive variations in the interference level on various shift locations in the control region, especially in presence of one or more non-colliding interferers, either in an ABS scenario, when only CRS is being transmitted by the interferer; or in a non-ABS scenario, when CRS-IC is being performed at a certain shift.

The PDCCH reliability scaling according to various embodiments may scale the resulting PDCCH soft bits (or may scale the considered noise power) to take into account these variations of the interference level. This may be achieved in two stages, as described below.

In the following, a first stage, which may include Intra-Symbol Scaling (RE/shift-specific scaling coefficients) will be described.

Intra-symbol scaling may be applied to incorporate the difference in relative reliability of PDCCH symbols at various shifts of a given OFDM symbol. Because the CRS pattern repeats after 6 REs, we basically need to determine the four scaling coefficients (leaving aside the serving cell CRS locations) for each OFDM symbol. A scaling coefficient of unity would be applied at the shift which encounters the lowest (CRS) interference. At other shift locations a scaling coefficient less than unity will be applied.

To this end, an exemplary PDCCH shift-dependent scaling method will be described in the following. The scaling method may select the scaling coefficients $\beta_i$ for i-th shift location based on the following equation:

$$\beta_i = \sqrt{\frac{\min_{\forall j}(\gamma_j)}{\gamma_i}}$$

where $\gamma_i$ may be a measure of inter-cell interference encountered at the i-th shift. One example could be to measure $\gamma_i$ as the mean received signal power at the i-th shift. The motivation for this comes from the fact that both noise power and desired signal power are expected to be identical at all shift locations, but the interference power can be potentially different based on the interfering cell CRS locations.

It is to be noted that the scaling coefficients $\beta_i$ (and the underlying metrics $\gamma_i$) can either be computed as wide-band metrics (e.g. in ABS scenarios where interference is expected to be flat over the entire band) or as sub-band metrics (e.g. in non-ABS scenarios where interference characteristics are likely to be different in different sub-bands).

It is further to be noted that the method according to various embodiments may consider as benchmark (in numerator) the minimum $\gamma_i$ of the current/same OFDM symbol or the third (first non-CRS) OFDM symbol (which may potentially belong to the non-control region with inherently different signal power characteristics), and may therefore be robust against possible power offsets between PDCCH and PDSCH, presence of PMCH, and the configuration of ABS patterns.

In the following, a second stage, including Inter-Symbol Scaling (Symbol-specific scaling coefficients) will be described.

Since the aforementioned intra-symbol scaling method adopts the min $\gamma_i$ of the given OFDM symbol as benchmark for applying shift-specific scaling on that OFDM symbol, it may be desired to incorporate the difference of reliability between multiple symbols, in case the control region spans multiple OFDM symbols (CFI>1). It is to be noted that since PCFICH spans only the first OFDM symbol, intra-symbol scaling alone may be optimal for its decoding. Only once the CFI (Control Format Indicator) information is known after PCFICH decoding, the inter-symbol scaling may be applied for better decoding of PDCCH and PHICH bits. The inter-symbol scaling may be applied as part of the QAM (Quadrature Amplitude Modulation) demapper, which scales the soft bits of a given OFDM symbol according to the ratio of Either the min $\gamma_i$ (the benchmark employed for intra symbol scaling) of each symbol, Or the overall estimated interference level (mean $\gamma_i$) of each symbol.

The third OFDM symbol (if part of control region), being never disturbed by CRS interference in absence of asynchronous interferer, may always be scaled with unity (i.e. considered most reliable).

In combination, this two-stage scaling of PDCCH soft bits may ensure that enough reliability information is embedded in the output LLRs (likelihood ratio) coming from various shift locations in different OFDM symbols. This in turn helps the channel decoder to extract correct PDCCH and PHICH payload.

Shift-specific reliability scaling according to various embodiment may be able to successfully distinguish the small number of ultra-reliable soft bits from garbage soft bits, and owing to a high aggregation level (corresponding to a high code rate) may be able to successfully recover the intended PDCCH payload.

Various embodiments offer a significant performance gain in cell-edge scenarios at the cost of little computational complexity.

Various embodiments may also be employed for data channel (PDSCH) interference mitigation in the CRS OFDM symbols, which may also lead to shift-specific interference level. Applied in this scenario, the methods and devices according to various embodiments may lead to direct improvement on PDSCH throughput.

The PDCCH performance improvement in cell-edge scenarios is an important area of improvement. Various embodiments may provide a performance gain in cell-edge scenarios at the cost of little computational complexity. Various embodiments may be used to bring throughput performance improvements for PDSCH in interference scenarios.

Control channel (PDCCH/PCFICH/PHICH) decoding in LTE is a fundamental prerequisite to any downlink data reception. According to various embodiments, the control channel detection performance may be improved by as much as 6 dB in typical cell-edge/inter-cell interference scenarios, as encountered in LTE cellular modem field trials.

Various embodiments related to baseband, cell Edge, inner receiver, interference, interference cancellation, interference mitigation, interference suppression, PDCCH, Physical Layer, and receiver.

Various embodiments related to LTE cell-edge performance enhancement for control channel reception.

Various embodiments related to LTE cell-edge performance enhancement for control channel reception (PDCCH/PHICH/PCFICH).

In the following, an example with presence of a single non-colliding ABS interferer on top of two 3GPP PDCCH test cases from 36.101 in section 8.4, namely test cases: 8.4.1.2.2 for 4 transmit antenna and 8.4.1.2.1 for 2 transmit antenna scenarios will be described. In the Table 1 below, the key parameters for these two test cases are summarized.

TABLE 1

| Parameters | Test Case 1 | Test Case 2 |
| --- | --- | --- |
| Underlying 3GPP Test Case | 8.4.1.2.2 from 36.101 | 8.4.1.2.1 from 36.101 |
| Tx Antenna Ports | 4 | 2 |
| Transmission Bandwidth | 5 MHz | 10 MHz |
| Transmission Channel | EPA-5 | ETU-70 |
| CFI | 2 | 2 |
| Aggregation Level | 2 | 4 |

Figure 6:
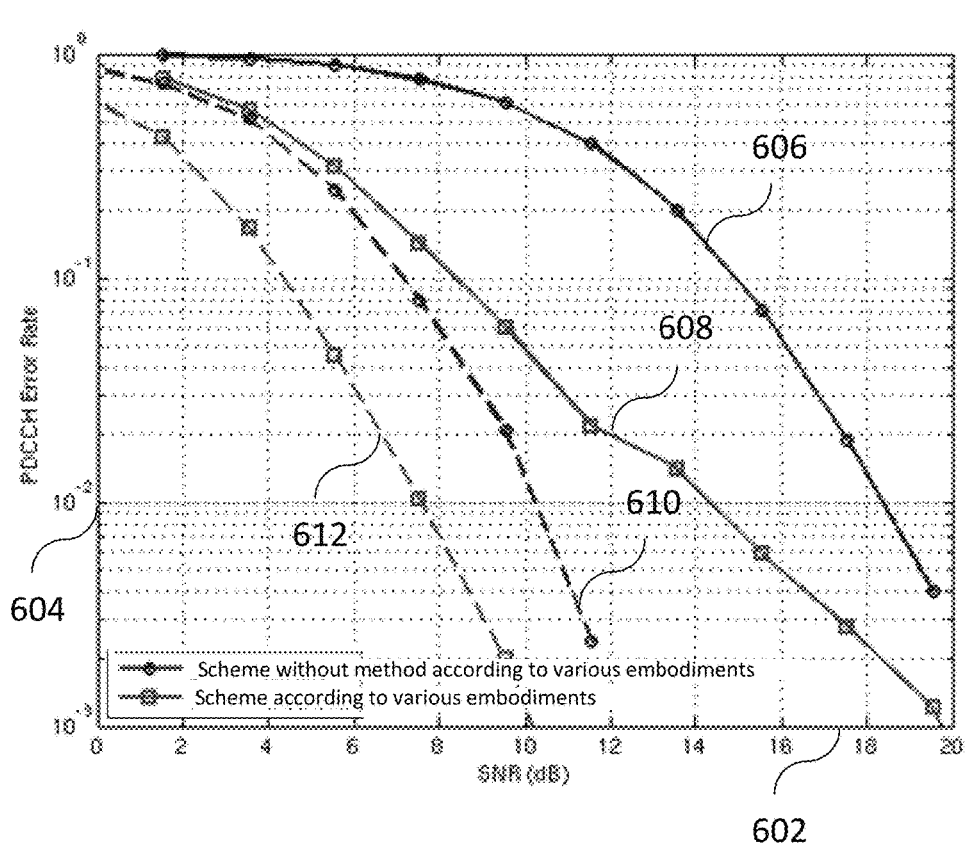
FIG. 6 shows a diagram illustrating a PDCCH error rate for a first test case.

FIG. 6 shows a diagram 600 illustrating a PDCCH error rate for test case 1. A horizontal line 602 indicates the SNR (signal to noise ratio), and a vertical line 604 indicates a PDCCH error rate.

Figure 7:
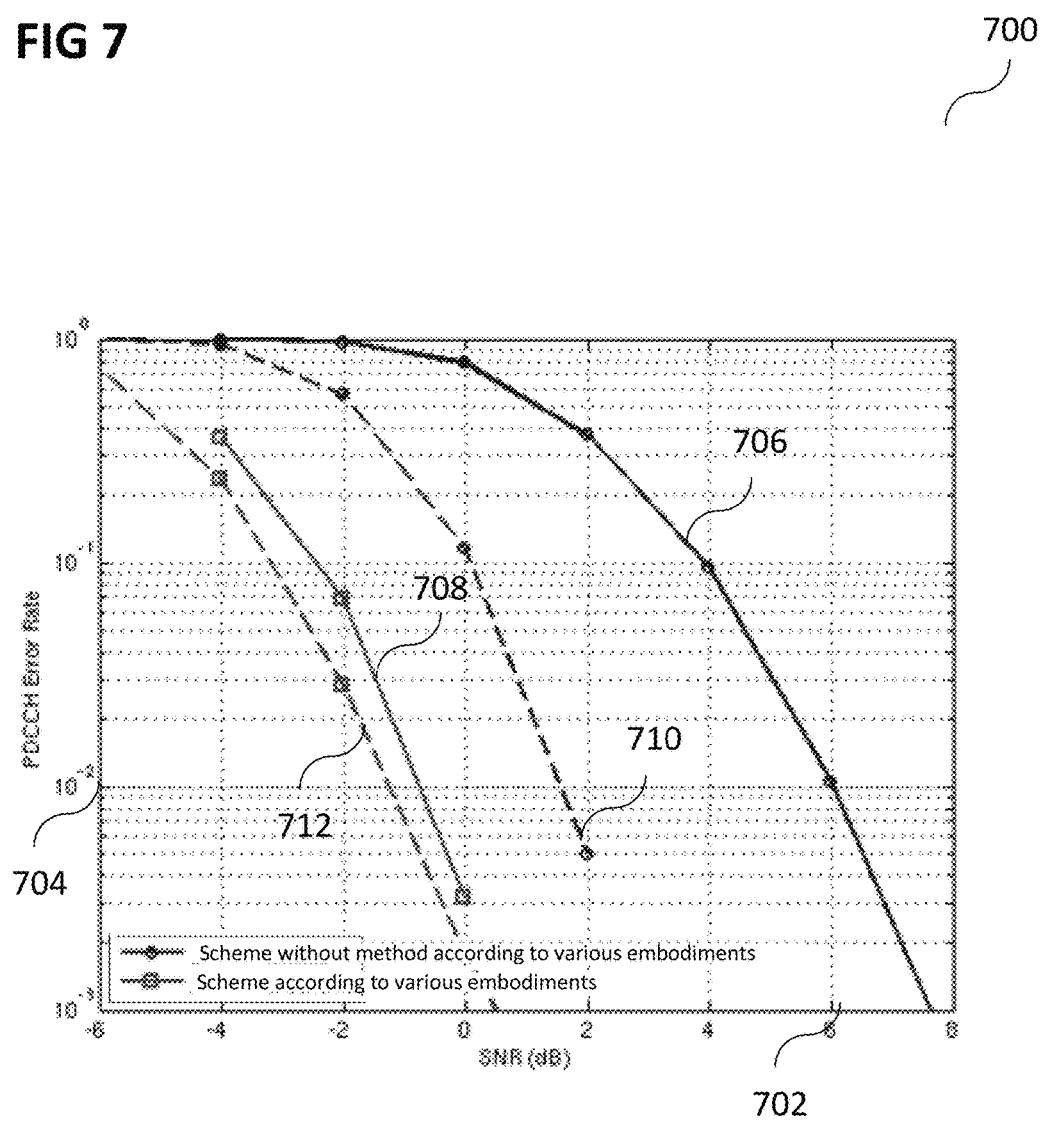
FIG. 7 shows a diagram illustrating a PDCCH error rate for a second test case.

FIG. 7 shows a diagram 700 illustrating a PDCCH error rate for test case 2. A horizontal line 702 indicates the SNR (signal to noise ratio), and a vertical line 704 indicates a PDCCH error rate.

To investigate the impact of interferer, two interferer strengths may be simulated, represented by INRs of 15 dB (solid lines; in FIG. 6: line 606 for the scheme without the method according to various embodiments, and line 608 for the scheme according to various embodiments; in FIG. 7: line 706 for the scheme without the method according to various embodiments, and line 708 for the scheme according to various embodiments) and 6 dB (dashed lines; in FIG. 6: line 610 for the scheme without the method according to various embodiments, and line 612 for the scheme according to various embodiments; in FIG. 7: line 710 for the scheme without the method according to various embodiments, and line 712 for the scheme according to various embodiments) respectively. Spatial interference suppression may be considered as a baseline technique, and may be therefore part of both the simulated schemes. CRS-IC may not be considered in these simulation settings, but it may well be considered to be present for a stronger interferer whose effect is already removed by CRS-IC.

It can be seen from FIG. 6 for the PDCCH error rate for test case 1, that at the reference benchmark rate of 1%, the performance gains are 4.0 dB and 2.2 dB at the INRs of 15 dB and 6 dB respectively.

It can be seen from FIG. 7 for the PDCCH error rate for test case 2, that at the reference benchmark rate of 1%, the performance gains are 6.8 dB and 2.7 dB at the INRs of 15 dB and 6 dB respectively.

The following examples pertain to further aspects.

Example 1 is a radio communication device comprising: a receiver configured to receive a radio signal on a radio channel; a noise level determination circuit configured to determine a noise level of the radio signal; an interference determination circuit configured to determine interference information indicating an amount of interference of the radio signal with another signal; an equalizer configured to determine a softbit based on the radio signal and the determined noise level; and a scaling circuit configured to scale based on the determined interference information at least one of the noise level and/or the softbit.

In example 2, the subject-matter of example 1 can optionally include that the softbit indicates a probability of a bit represented by the radio signals to have a pre-determined value.

In example 3, the subject-matter of any one of examples 1 to 2 can optionally include that the noise level determination circuit is configured to determine the noise level of the radio signals based on pilot symbols.

In example 4, the subject-matter of any one of examples 1 to 3 can optionally include: a channel quality determination circuit configured to determine a quality of the radio channel; wherein the equalizer is configured to determine the softbit further based on the determined quality of the radio channel.

In example 5, the subject-matter of any one of examples 1 to 4 can optionally include that the channel quality determination circuit is configured to determine the quality of the radio channel based on the determined quality of the radio channel.

In example 6, the subject-matter of any one of examples 1 to 5 can optionally include that the scaling circuit is configured to scale for different symbols in a resource element differently.

In example 7, the subject-matter of any one of examples 1 to 6 can optionally include that the interference determination circuit is configured to determine the interference information for a plurality of shift locations in an OFDM symbol.

In example 8, the subject-matter of example 7 can optionally include that the scaling circuit is configured to scale for different symbols in a resource element identically.

In example 9, the subject-matter of any one of examples 1 to 8 can optionally include that the scaling circuit is configured to upscale the noise level.

In example 10, the subject-matter of any one of examples 1 to 9 can optionally include that the scaling circuit is configured to downscale the softbit.

In example 11, the subject-matter of any one of examples 1 to 10 can optionally include that the scaling circuit is configured to determine a scaling factor and configured to scale based on the scaling factor.

In example 12, the subject-matter of example 11 can optionally include that the scaling circuit is configured to determine the scaling factor for a pre-determined shift in a OFDM symbol based on a square root of a quotient of a minimum inter-cell interference encountered at various shifts in the OFDM symbol and the inter-cell interference at the pre-determined shift in the OFDM symbol.

Example 13 is a method for controlling a radio communication device, the method comprising: receiving a radio signal on a radio channel; determining a noise level of the radio signal; determining interference information indicating an amount of interference of the radio signal with another signal; determining a softbit based on the radio signal and the determined noise level; and scaling based on the determined interference information at least one of the noise level and/or the softbit.

In example 14, the subject-matter of example 13 can optionally include that the softbit indicates a probability of a bit represented by the radio signals to have a pre-determined value.

In example 15, the subject-matter of any one of examples 13 to 14 can optionally include determining the noise level of the radio signals based on pilot symbols.

In example 16, the subject-matter of any one of examples 13 to 15 can optionally include: determining a quality of the radio channel; and determining the softbit further based on the determined quality of the radio channel.

In example 17, the subject-matter of any one of examples 13 to 16 can optionally include determining the quality of the radio channel based on the determined quality of the radio channel.

In example 18, the subject-matter of any one of examples 13 to 17 can optionally include scaling for different symbols in a resource element differently.

In example 19, the subject-matter of any one of examples 13 to 18 can optionally include determining the interference information for a plurality of shift locations in an OFDM symbol.

In example 20, the subject-matter of example 19 can optionally include scaling for different symbols in a resource element identically.

In example 21, the subject-matter of any one of examples 13 to 20 can optionally include upscaling the noise level.

In example 22, the subject-matter of any one of examples 13 to 21 can optionally include downscaling the softbit.

In example 23, the subject-matter of any one of examples 13 to 22 can optionally include determining a scaling factor and configured to scale based on the scaling factor.

In example 24, the subject-matter of example 23 can optionally include determining the scaling factor for a pre-determined shift in a OFDM symbol based on a square root of a quotient of a minimum inter-cell interference encountered at various shifts in the OFDM symbol and the inter-cell interference at the pre-determined shift in the OFDM symbol.

Example 25 is a radio communication device comprising: a receiver means for receiving a radio signal on a radio channel; a noise level determination means for determining a noise level of the radio signal; an interference determination means for determining interference information indicating an amount of interference of the radio signal with another signal; an equalizer means for determining a softbit based on the radio signals and the determined noise level;

and a scaling means for scaling based on the determined interference information at least one of the noise level and/or the softbit.

In example 26, the subject-matter of example 25 can optionally include that the softbit indicates a probability of a bit represented by the radio signals to have a predetermined value.

In example 27, the subject-matter of any one of examples 25 to 26 can optionally include that the noise level determination means is for determining the noise level of the radio signals based on pilot symbols.

In example 28, the subject-matter of any one of examples 25 to 27 can optionally include: a channel quality determination means is for determining a quality of the radio channel; wherein the equalizer means is for determining the softbit further based on the determined quality of the radio channel.

In example 29, the subject-matter of any one of examples 25 to 28 can optionally include that wherein the channel quality determination means is for determining the quality of the radio channel based on the determined quality of the radio channel.

In example 30, the subject-matter of any one of examples 25 to 29 can optionally include that the scaling means is for scaling for different symbols in a resource element differently.

In example 31, the subject-matter of any one of examples 25 to 30 can optionally include that the interference determination means is for determining the interference information for a plurality of shift locations in an OFDM symbol.

In example 32, the subject-matter of example 31 can optionally include that the scaling means is for scaling for different symbols in a resource element identically.

In example 33, the subject-matter of any one of examples 25 to 32 can optionally include that the scaling means is for upscaling the noise level.

In example 34, the subject-matter of any one of examples 25 to 33 can optionally include that the scaling means is for downscaling the softbit.

In example 35, the subject-matter of any one of examples 25 to 34 can optionally include that the scaling means is for determining a scaling factor and configured to scale based on the scaling factor.

In example 36, the subject-matter of example 35 can optionally include that the scaling means is for determining the scaling factor for a pre-determined shift in a OFDM symbol based on a square root of a quotient of a minimum inter-cell interference encountered at various shifts in the OFDM symbol and the inter-cell interference at the pre-determined shift in the OFDM symbol.

Example 37 is a computer readable medium including program instructions which when executed by a processor cause the processor to perform a method for controlling a radio communication device, the computer readable medium further including program instructions which when executed by a processor cause the processor to perform: receiving a radio signal on a radio channel; determining a noise level of the radio signal; determining interference information indicating an amount of interference of the radio signal with another signal; determining a softbit based on the radio signals and the determined noise level; and scaling based on the determined interference information at least one of the noise level and/or the softbit.

In example 38, the subject-matter of example 37 can optionally include that the softbit indicates a probability of a bit represented by the radio signals to have a predetermined value.

In example 39, the subject-matter of any one of examples 37 to 38 can optionally include that the computer readable medium further including program instructions which when executed by a processor cause the processor to perform: determining the noise level of the radio signals based on pilot symbols.

In example 40, the subject-matter of any one of examples 37 to 39 can optionally include that the computer readable medium further including program instructions which when executed by a processor cause the processor to perform: determining a quality of the radio channel; and determining the softbit further based on the determined quality of the radio channel.

In example 41, the subject-matter of any one of examples 37 to 40 can optionally include that the computer readable medium further including program instructions which when executed by a processor cause the processor to perform: determining the quality of the radio channel based on the determined quality of the radio channel.

In example 42, the subject-matter of any one of examples 37 to 41 can optionally include that the computer readable medium further including program instructions which when executed by a processor cause the processor to perform: scaling for different symbols in a resource element differently.

In example 43, the subject-matter of any one of examples 37 to 42 can optionally include that the computer readable medium further including program instructions which when executed by a processor cause the processor to perform: determining the interference information for a plurality of shift locations in an OFDM symbol.

In example 44, the subject-matter of example 43 can optionally include that the computer readable medium further including program instructions which when executed by a processor cause the processor to perform: scaling for different symbols in a resource element identically.

In example 45, the subject-matter of any one of examples 37 to 44 can optionally include that the computer readable medium further including program instructions which when executed by a processor cause the processor to perform: upscaling the noise level.

In example 46, the subject-matter of any one of examples 37 to 45 can optionally include that the computer readable medium further including program instructions which when executed by a processor cause the processor to perform: downscaling the softbit.

In example 47, the subject-matter of any one of examples 37 to 46 can optionally include that the computer readable medium further including program instructions which when executed by a processor cause the processor to perform; determining a scaling factor and configured to scale based on the scaling factor.

In example 48, the subject-matter of example 47 can optionally include that the computer readable medium further including program instructions which when executed by a processor cause the processor to perform: determining the scaling factor for a pre-determined shift in a OFDM symbol based on a square root of a quotient of a minimum inter-cell interference encountered at various shifts in the OFDM symbol and the inter-cell interference at the pre-determined shift in the OFDM symbol.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A radio communication device comprising:
a receiver configured to receive a radio signal on a radio channel;
a noise level determination circuit configured to determine a noise level of the radio signal;
an interference determination circuit configured to determine interference information indicating an amount of interference of the radio signal with another signal;
an equalizer configured to determine a softbit based on the radio signal and the determined noise level; and
a scaling circuit configured to scale at least one of the noise level and/or the softbit based on the determined interference information,
wherein the scaling circuit is configured to determine a scaling factor and configured to scale based on the scaling factor and
wherein the scaling circuit is configured to determine the scaling factor for a pre-determined shift in an OFDM symbol based on a square root of a quotient of a minimum inter-cell interference encountered at various shifts in the OFDM symbol and the inter-cell interference at the pre-determined shift in the OFDM symbol.

2. The radio communication device of claim 1,
wherein the softbit indicates a probability of a bit represented by the radio signals to have a pre-determined value.

3. The radio communication device of claim 1,
wherein the noise level determination circuit is configured to determine the noise level of the radio signals based on pilot symbols.

4. The radio communication device of claim 1, further comprising:
a channel quality determination circuit configured to determine a quality of the radio channel;
wherein the equalizer is configured to determine the softbit further based on the determined quality of the radio channel.

5. The radio communication device of claim 1,
wherein the channel quality determination circuit is configured to determine the quality of the radio channel based on the determined quality of the radio channel.

6. The radio communication device of claim 1,
wherein the scaling circuit is configured to scale for different symbols in a resource element differently.

7. The radio communication device of claim 1,
wherein the interference determination circuit is configured to determine the interference information for a plurality of shift locations in an OFDM symbol.

8. The radio communication device of claim 7,
wherein the scaling circuit is configured to scale for different symbols in a resource element identically.

9. The radio communication device of claim 1,
wherein the scaling circuit is configured to upscale the noise level.

10. The radio communication device of claim 1,
wherein the scaling circuit is configured to downscale the softbit.

11. A method for controlling a radio communication device,
the method comprising:
receiving a radio signal on a radio channel;
determining a noise level of the radio signal;
determining interference information indicating an amount of interference of the radio signal with another signal;
determining a softbit based on the radio signal and the determined noise level; and
scaling at least one of the noise level and/or the softbit based on the determined interference information,
wherein the at least one of the noise level and the softbit is scaled by a scaling factor determined by a scaling circuit based on the determined interference information;
determining the scaling factor for a pre-determined shift in an OFDM symbol based on a square root of a quotient of a minimum inter-cell interference encountered at various shifts in the OFDM symbol and the inter-cell interference at the pre-determined shift in the OFDM symbol.

12. The method of claim 11,
wherein the softbit indicates a probability of a bit represented by the radio signals to have a pre-determined value.

13. The method of claim 11, further comprising:
determining the noise level of the radio signals based on pilot symbols.

14. The method of claim 11, further comprising:
determining a quality of the radio channel; and
determining the softbit further based on the determined quality of the radio channel.

15. The method of claim 11, further comprising:
determining the quality of the radio channel based on the determined quality of the radio channel.

16. The method of claim 11, further comprising:
scaling for different symbols in a resource element differently.

17. The method of claim 11, further comprising:
determining the interference information for a plurality of shift locations in an OFDM symbol.

18. The method of claim 17, further comprising:
scaling for different symbols in a resource element identically.

19. The method of claim 11, further comprising:
upscaling the noise level.

20. The method of claim 11, further comprising:
downscaling the softbit.

21. A non-transitory computer readable medium including program instructions, which, when executed by a processor, cause the processor to perform a method for controlling a radio communication device:
receiving a radio signal on a radio channel;
determining a noise level of the radio signal;
determining interference information indicating an amount of interference of the radio signal with another signal;
determining a softbit based on the radio signal and the determined noise level; and
scaling at least one of the noise level and/or the softbit based on the determined interference information,
wherein the at least one of the noise level and/or the softbit is scaled by a scaling factor determined by a scaling circuit based on the determined interference information;
determining the scaling factor for a pre-determined shift in an OFDM symbol based on a square root of a quotient of a minimum inter-cell interference encountered at various shifts in the OFDM symbol and the inter-cell interference at the pre-determined shift in the OFDM symbol.

22. A radio communication device comprising: a receiver configured to receive a radio signal on a radio channel; a noise level determination circuit configured to determine a noise level of the radio signal; an interference determination circuit configured to determine interference information; an equalizer configured to determine a soft bit based on the radio signal and the determined noise level; and a scaling circuit configured to scale the noise level based on the determined interference information, wherein the interference information indicates an interference level between the radio signal and another signal.

23. A radio communication device comprising:
a receiver configured to receive a radio signal on a radio channel;
a noise level determination circuit configured to determine a noise level of the radio signal;
an interference determination circuit configured to determine interference information;
an equalizer configured to determine a softbit based on the radio signal and the determined noise level; and
a scaling circuit configured to scale the noise level and the softbit based on the determined interference information.

24. The radio communication device of claim 23,
wherein the interference information indicates an interference level between the radio signal and another signal.

* * * * *

UNITED STATES PATENT AND TRADEMARK OFFICE
CERTIFICATE OF CORRECTION

PATENT NO. : 9,673,850 B2
APPLICATION NO. : 14/801872
DATED : June 6, 2017
INVENTOR(S) : Nisar et al.

It is certified that error appears in the above-identified patent and that said Letters Patent is hereby corrected as shown below:

Claim 11 - Column 14, Line 8: delete "wherein the at least one of the noise level and the softbit" and insert --wherein the at least one of the noise level and/or the softbit-- thereof.

Signed and Sealed this
Twelfth Day of December, 2017

Joseph Matal
*Performing the Functions and Duties of the
Under Secretary of Commerce for Intellectual Property and
Director of the United States Patent and Trademark Office*